Figure 1:
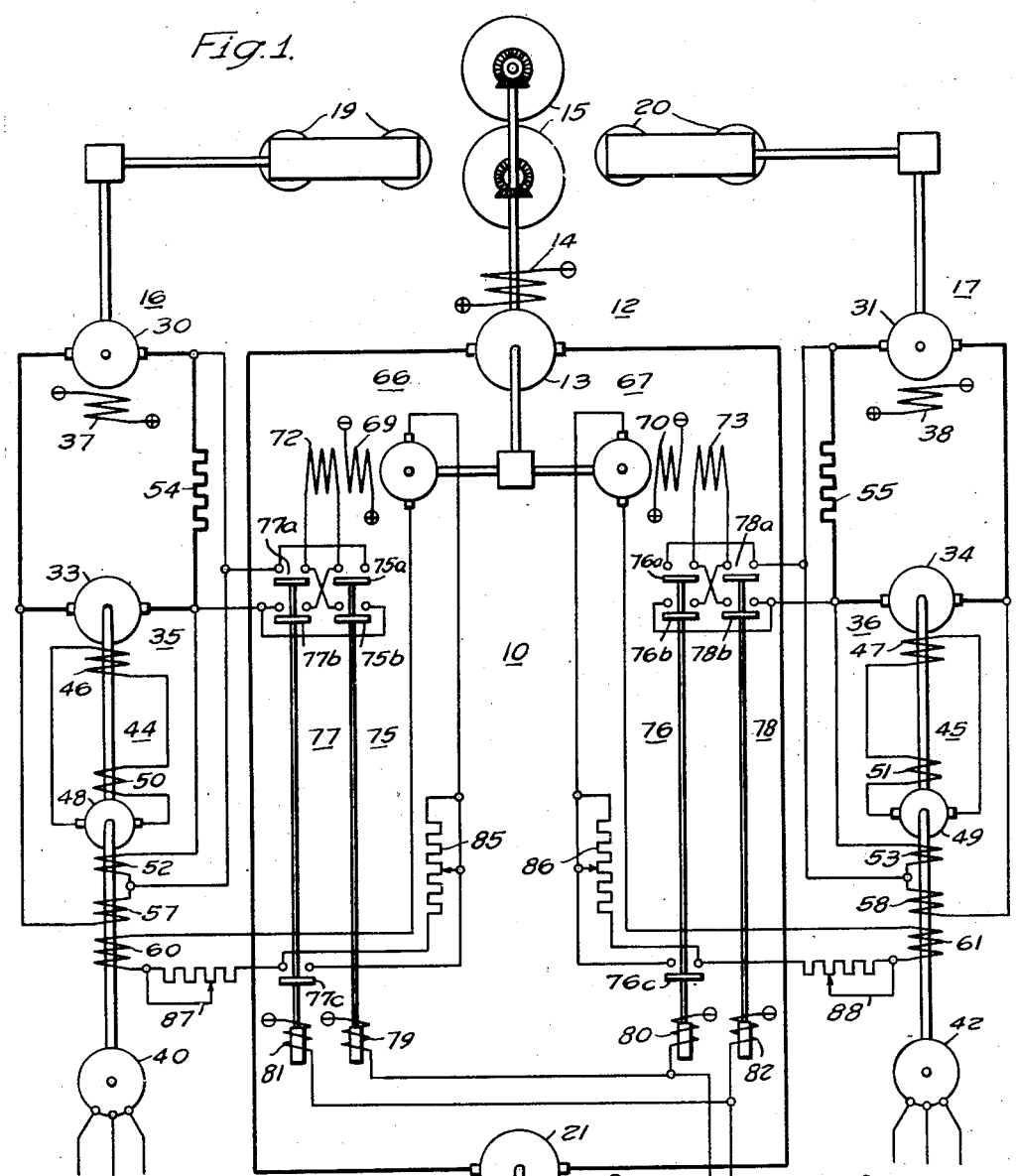

Nov. 16, 1948.   A. F. KENYON   2,454,183
MOTOR CONTROL SYSTEM
Filed Aug. 22, 1946

WITNESSES:
E. G. M'Blakey
F. V. Glolma

INVENTOR
Alonzo F. Kenyon.
BY
L. M. Crawford
ATTORNEY

Patented Nov. 16, 1948

2,454,183

UNITED STATES PATENT OFFICE 2,454,183

MOTOR CONTROL SYSTEM

Alonzo F. Kenyon, Pittsburgh, Pa., assignor to Westinghouse Electric Corporation, East Pittsburgh, Pa., a corporation of Pennsylvania Application August 22, 1946, Serial No. 692,339

8 Claims. (Cl. 318—6)

My invention relates, generally, to control systems, and it has reference, in particular, to motor control systems.

Generally stated, it is an object of my invention to provide a motor control system that is simple and inexpensive to manufacture, and is reliable and efficient in operation.

More specifically, it is an object of my invention to provide for matching the speed of a feed roll motor in a rolling mill with the speed of the main roll motor over a wide range of speeds and under varying load conditions.

Another object of my invention is to provide for so controlling the excitation of a control generator in a control system for a motor as to obtain substantially the same percentage of speed regulation with the motor at different speeds.

Another object of my invention is for controlling the operation of a plurality of auxiliary motors in accordance with the operation of a main motor by using a pilot generator driven by the main motor, and whose excitation is differentially responsive to the load on the auxiliary motors.

It is an important object of my invention to provide for producing a drooping load characteristics in a motor so as to obtain substantially the same percentage of speed regulation at different speeds.

A further object of my invention is to provide for differentially exciting a pilot generator driven by a main roll motor in accordance with the load on a feed roll motor and for energizing the feed roll motor in accordance with the output of the pilot generator and the load on said motor.

Yet another object of my invention is to provide a speed matching system for a pair of motors wherein the motor whose speed is controlled to match its speed with that of the other motor is given a steeply drooping speed-load characteristic with substantially the same percentage of regulation at all speeds.

Other objects will in part be obvious, and will in part be described hereinafter.

In practicing my invention, in one of its forms a feed roll motor in a rolling mill is energized from a generator whose output is controlled by a control generator having field windings energized in accordance with the feed roll motor current and in accordance with the output of a pilot generator driven by the main roll motor. A drooping speed regulation characteristic is provided which produces substantially the same percentage of speed regulation for the feed roll motor at all speeds by using a differential field winding on the pilot generator which is energized in accordance with the feed roll motor current and whose connections are reversed whenever the main roll motor is reversed.

Figure 2:
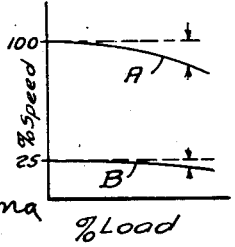

For a more complete understanding of the nature and scope of my invention, reference may be made to the following detailed description which may be studied in connection with the accompanying drawing, in which:

Figure 1 is a diagrammatic view of a motor system embodying the invention in one of its forms, and Fig. 2 shows curves illustrating the speed regulation characteristics of the feed roll motor under varying load conditions.

Referring to Figure 1, the reference numeral 10 may denote generally a motor system wherein a main motor 12 having an armature 13 and a field winding 14 may be connected to reversibly drive a load such as the main rolls 15 of a rolling mill. Auxiliary motors 16 and 17 may be used in association with the main motor to drive means operable in accordance with the speed of the main motor, such as, for example, feed rolls 19 and 20 which may be positioned ahead of and behind the main rolls 15 for feeding material to and from the rolls 15 in opposite directions.

The field winding 14 of the main roll motor may be excited from any suitable, controllable source of electrical energy. The armature 13 may be energized from a variable voltage source, being for example connected in circuit with the armature 21 of a main generator 22 having a field winding 23. The speed of the main motor 12 may be controlled by varying the excitation of the generator field winding 23 from a suitable source of electrical energy through suitable control means represented by the rheostat 24. Reversal of the main roll motor 12 may be effected by operatively connecting the field winding 23 to the generator 22 in opposite senses through one or the other of "forward" and "reverse" switches 25 and 26 under the control of manual "forward" and "reverse" control switches 28 and 29, respectively.

Operation of the feed roll motors 16 and 17 may be effected by connecting their armatures 30 and 31 in circuit with the armatures 33 and 34 of auxiliary generators 35 and 36, respectively. The field windings 37 and 38 of the feed roll motors may be energized from a suitable source of substantially constant voltage. The auxiliary generators may be driven by means of auxiliary motors 40 and 42, which may, for example, be energized from a suitable source of alternating current through any suitable control means, so as to start them when the main motor 12 is started.

In order to provide for controlling the speeds of the feed roll motors 16 and 17, means such as the control generators 44 and 45 may be used to energize the field windings 46 and 47 of the auxiliary generators 35 and 36, respectively. The armatures 48 and 49 of the control generators 44 and 45 may be connected in series circuit relation with the field windings 46 and 47 of the auxiliary generators and self-energizing series field windings 50 and 51, respectively. The control generators may also be provided with IR drop compensation field windings 52 and 53 which may be energized in accordance with the armature currents of their respective feed roll motors 16 and 17 to produce more accurate speed matching at low speeds. They may, for example, be connected across resistors 54 and 55 connected in the armature circuits of the feed roll motors 16 and 17, respectively. Control field windings 57 and 58 may also be provided on the control generators, being connected across the armatures of the feed roll motors and/or IR drop compensation field winding.

In order to provide for controlling the operation of the feed roll motors 16 and 17 in predetermined relation with speed characteristics of the main roll motor 12, the control generators 44 and 45 may be provided with pattern field windings 60 and 61, respectively, which provide the principal excitation of the control generators, and oppose the control field windings. Energization of these field windings may be effected by means of pilot generators 66 and 67 which may be operated in accordance with the speed of the main motor, being, for example, driven by the main roll motor 12. The pilot generators may be provided with main field windings 69 and 70 which may be connected to a suitable source of electrical energy, and differential field windings 72 and 73 for producing a drooping speed regulation characteristic. These windings may be energized in accordance with the load on the respective feed roll motors. The field windings 72 and 73 may, for example, be connected across the resistors 54 and 55 in the armature circuits of the feed roll motors 16 and 17, respectively.

In order to provide for securing the same differential effect on the energization of the pattern field windings 60 and 61, even though the direction of operation of the pilot generators and hence the output, reverses when the main roll motor 12 is reversed, means such as the "forward" switch means 75, 76 and "reverse" switch means 77, 78 may be provided for reversing the connections of the differential field windings 72 and 73 through contact members 75a, 75b, 76a, 76b and 77a, 77b, 78a, 78b, so as to maintain the same relative polarities under reverse operating conditions. Operation of the switches 75, 76 and 77, 78 may be effected by connecting their respective operating windings 79, 80 and 81, 82 for energization under the control of the manual control switches 28 and 29, respectively.

Since the speeds of the feed rolls 19 and 20 must necessarily be different owing to the reduction in thickness of material being rolled between the main rolls 15, draft control means comprising rheostats 85 and 86 may be connected in circuit relation with the pattern field windings 60 and 61 of the control generators 44 and 45, respectively. Contact members 77c and 76c of the "reverse" and "forward" switches 77 and 76, respectively, may be used to shunt the draft control rheostats 85 and 86 to change the relative speeds of the feed roll motors, depending on their direction of operation. Roll diameter control rheostats 87 and 88 may also be provided for changing the relative speeds of the feed roll motors in accordance with differences in the relative diameters of the feed rolls and main rolls.

In operation, the "forward" manual control switch 28 may be closed to effect operation of the "forward" control switch 25 for connecting the field winding 23 of the main generator to the source, whereby the armature 13 of the main roll motor 12 may be energized to operate the rolls 15 of roll material in the "forward" direction proceeding from left to right.

The motors 40 and 42 may be started in any suitable manner. Upon operation of the switch 28, the operating windings 79 and 80 of the "forward" control switch 75 and 76 are also energized. The differential field winding 72 of the pilot generator 66 will thus be connected across the control resistor 58 through contact members 75a and 75b of the "forward" control switch means 75 in such a direction as to be differential with respect to the main field winding 69. The differential field winding 73 of the pilot generator 67 will likewise be connected through contact members 76a and 76b of the "forward" control switch 76 to the control resistor 59 in such a sense as to be differential with respect to the main field winding 70. The draft control rheostat 86 of the pattern field 64 will be shunted by contact member 76c, while the draft control rheostat 85 remains connected in circuit with the pattern field 63. Accordingly the excitation of the pattern field winding 61 will be greater than that of the pattern field winding 60, thus increasing the net excitation of the control generator 45 relative to that of the control generator 44, and increasing the speed of the feed roll motor 17 relative to the speed of the feed roll motor 16 to accommodate the increased speed of the material being rolled as it leaves the rolls.

When the main roll motor 12 is reversed by opening the "forward" manual control switch 28 and closing the "reverse" manual switch 29, the switches 25 and 26 are energized and deenergized respectively. The motor 12 reverses, reversing the direction of rotation of the pilot generators 66 and 67. The control switches 75, 76 are deenergized and the control switches 77, 78 are energized. The connections of the differential field windings 72 and 73 of the pilot generators are therefore changed to maintain differential relations with the main field windings 69 and 70, despite reversal of output of the auxiliary generators 35 and 36 due to reversal of the output of the pilot generators 66 and 67. The draft control rheostat 85 is now shunted by the "reverse" switch 77 to increase the speed of the roll motor 16 relative to the roll motor 17.

During operation in either direction, an increase in load on either one of the feed roll motors 16 or 17 results in an increase in the drop across the resistor 54 or 55 and an increase in the excitation of the respective differential field winding 72 or 73 of the pilot generator 66 or 67, as well as an increase in the excitation of the control generator IR drop compensating field winding 52 or 53. Accordingly the output of the particular pilot generator will be reduced, while the output of the particular control generator will tend to increase due to increased excitation of its IR drop compensating winding 52 or 53. Since the pattern field windings 60 and 61 energized from the pilot generators are cumulative with respect to the principal excitation of the control generators, the output of the particular control generator affected is modified thereby, so that the speed of the respective feed roll motor energized in accordance therewith is also modified.

Thus the speed matching function of the system is modified by a drooping speed regulation characteristic. This arrangement has the particular advantage that at low speeds the effect of the differential field winding of the pilot generator is small, due to the low speed of the pilot generators. Since the pilot generator outputs vary with their speed, as well as with the loads on their associated feed roll motors, the modification is less at low speeds, and substantially the same percentage of speed regulation is obtained at all speeds, instead of the same actual speed regulation. This is shown by the curves A and B of Fig. 2, which represent speed regulation curves obtained by practicing my invention at 100% and 25% speeds, respectively. It will be seen that the amount of droop is proportional to the speed, as well as to the load.

From the above description and the accompanying drawing, it will be seen that I have provided a simple and effective speed matching system wherein substantially the same percentage of speed regulation is obtained at all motor speeds. A system embodying my invention avoids interconnection of the variable voltage systems with the field excitation system, hence reducing the probability of false operation in service. Accurate speed matching of the feed roll and main mill motors at all speeds is obtained by using a pilot exciter whose output is directly proportional to the main mill motor and differentially proportional to the feed motor load, to provide a drooping speed and load characteristics for the feed roll motor which is variable for different speeds and different loads.

Since certain changes may be made in the above described construction and different embodiments of the invention may be made without departing from the spirit and scope of the invention, it is intended that all the matter contained in the above description and shown in the accompanying drawing shall be considered as illustrative, and not in a limiting sense.

I claim as my invention:

1. In a control system for controlling one motor in accordance with the speed of another motor, control means producing a control voltage differentially responsive to the speed of said another motor and the load on said one motor, and generating means connected to supply electrical energy to said one controlled motor in accordance with said control voltage and the load on said one controlled motor.

2. A control system for a motor comprising, a pilot generator responsive to a predetermined speed condition, excitation means connected to vary the output of said pilot generator inversely with variation of the load on said motor, and circuit means including a regulating generator responsive to the output of the pilot generator and the load on said motor connected to apply a variable control voltage to said motor.

3. A speed matching system for controlling the speed of one motor in accordance with the speed of another motor comprising, a pilot generator responsive to the speed of said another motor, excitation means varying the output of the pilot generator in the opposite sense to variations in the load on said one controlled motor, and a regulating generator responsive to the output of the pilot generator and the load on said one motor connected to control the supply of electrical energy to said one controlled motor.

4. A control system for controlling one motor in accordance with the speed of another motor comprising, a pilot generator driven by said another motor and having a plurality of field windings and an armature, means connecting one of the field windings to a source of control voltage, means connecting another of the windings differentially with respect to said one field winding for energization in accordance with the armature current of said one motor, a control generator energized in accordance with the output of the pilot generator and with the armature current of said one motor, means responsive to the output of the control generator connected to apply a variable voltage to the said one motor, and means operable to reverse the said another motor and reverse the connections of said another of the pilot generator field windings.

5. A control system for the main motor driving the main rolls of a rolling mill, and a feed roll motor driving rolls for feeding material relative to the main rolls comprising a pilot generator driven by the main motor, said generator being provided with a main field winding connected to a source of substantially constant voltage and a differential field winding energized in accordance with the armature current of the feed roll motor, and means including a control generator cumulatively responsive to the output of the pilot generator and the armature current of the feed roll motor connected to apply a variable voltage to the feed roll motor.

6. In a motor control system, a main motor operable to drive the main rolls of a rolling mill, a feed roll motor connected to drive feed rolls in predetermined relation to the main rolls, means responsive to the speed of the main motor for producing a control voltage variable differentially with respect to the load on the feed roll motor, a control generator operable to produce a voltage responsive to the output of the pilot generator and to the load on the feed roll motor, and a generator responsive to the output of the control generaotr connected to energize the feed roll motor.

7. In a motor system, a main motor driving the main mill rolls, a pair of feed roll motors driving feed rolls on opposite sides of the main rolls, a pair of pilot generators associated one with each feed roll motor and responsive to the speed of the main mill rolls, said generators having main field windings energized from a source of substantially constant voltage and differential field windings energized in accordance with the armature currents of the associated feed roll motors, a control generator associated with each feed roll motor responsive to the output of the associated pilot generator and the armature current of its associated feed roll motor, draft control means operable to vary the output of the control generators in accordance with the reduction at the main rolls, and means operable to reverse the connections of the pilot generator differential field windings and selectively render one of the draft control means ineffective in accordance with the direction of rotation of the main roll motor.

8. In a control system for controlling a motor in accordance with a reversible variable speed motor, means producing a control voltage responsive to the load on the motor, means including a control generator connected to apply a variable voltage to the motor to be controlled, said control generator having a pattern field winding and a field winding energized in accordance with the load on the motor, means connected to energize the pattern field winding including a pilot generator having a driving connection to the reversible variable speed motor, said pilot generator having a main field winding energized from a source of substantially constant voltage and a differential field winding energized in accordance with the load on the motor, control means effective to reduce the energization of the pattern field winding, and means operable to effect reversal of the reversible variable speed motor, reverse the connections of the differential field winding and render the control means ineffective.

ALONZO F. KENYON.

REFERENCES CITED

The following references are of record in the file of this patent:

UNITED STATES PATENTS

| Number | Name | Date |
|---|---|---|
| 2,264,277 | Cook | Dec. 2, 1941 |
| 2,342,790 | Cook | Feb. 29, 1944 |